United States Patent
Popp et al.

(10) Patent No.: US 9,849,545 B2
(45) Date of Patent: Dec. 26, 2017

(54) LASER-SUPPORTED PLASMA PROCESSING

(71) Applicant: TRUMPF Werkzeugmaschinen GmbH + Co. KG, Ditzingen (DE)

(72) Inventors: Andreas Popp, Schwieberdingen (DE); Tim Hesse, Ditzingen (DE); Tobias Kaiser, Leonberg (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 286 days.

(21) Appl. No.: 14/526,808

(22) Filed: Oct. 29, 2014

(65) Prior Publication Data

US 2015/0053656 A1 Feb. 26, 2015

Related U.S. Application Data

(63) Continuation of application No. PCT/EP2013/001230, filed on Apr. 24, 2013.

(30) Foreign Application Priority Data

Apr. 30, 2012 (DE) .................. 10 2012 207 201

(51) Int. Cl.
*B23K 28/02* (2014.01)
*B23K 10/00* (2006.01)
(Continued)

(52) U.S. Cl.
CPC .............. *B23K 28/02* (2013.01); *B23K 10/00* (2013.01); *B23K 10/02* (2013.01); *B23K 26/0734* (2013.01); *B23K 26/1429* (2013.01)

(58) Field of Classification Search
None
See application file for complete search history.

(56) References Cited

U.S. PATENT DOCUMENTS

| | | | | |
|---|---|---|---|---|
| 4,380,365 A | * | 4/1983 | Gross | G02B 6/245 219/121.65 |
| 5,700,989 A | * | 12/1997 | Dykhno | B23K 28/02 219/121.45 |

(Continued)

FOREIGN PATENT DOCUMENTS

| | | |
|---|---|---|
| CN | 1325778 A | 12/2001 |
| CN | 1943959 A | 4/2007 |

(Continued)

OTHER PUBLICATIONS

International Search Report from corresponding PCT Application No. PCT/EP2013-001230, dated Aug. 16, 2013, 6 pages.

(Continued)

*Primary Examiner* — David Angwin
*Assistant Examiner* — John J Norton
(74) *Attorney, Agent, or Firm* — Fish & Richardson P.C.

(57) ABSTRACT

Methods, devices and systems for laser-supported plasma cutting or plasma welding of a workpiece. In one aspect, a method includes producing a plasma beam which extends in an expansion direction between an electrode and a processing location on the workpiece, the plasma beam having, with respect to a center axis of the plasma beam that extends in the expansion direction, an inner central region and an outer edge region, and supplying laser radiation to the outer edge region of the plasma beam. The laser radiation supplied to the outer edge region extends parallel with the center axis of the plasma beam.

22 Claims, 3 Drawing Sheets

(51) Int. Cl.
   *B23K 10/02*      (2006.01)
   *B23K 26/073*     (2006.01)
   *B23K 26/14*      (2014.01)

(56) References Cited

U.S. PATENT DOCUMENTS

| | | | |
|---|---|---|---|
| 5,705,785 A * | 1/1998 | Dykhno | B23K 26/1429 219/121.45 |
| 6,172,323 B1 * | 1/2001 | Ishide | B23K 26/1429 219/121.39 |
| 6,191,381 B1 | 2/2001 | Kabir | |
| 6,191,386 B1 * | 2/2001 | Albright | B23K 26/1429 219/130.4 |
| 2001/0047984 A1 | 12/2001 | Briand et al. | |
| 2002/0017509 A1 | 2/2002 | Ishide et al. | |
| 2002/0017513 A1 | 2/2002 | Nagura et al. | |
| 2004/0156585 A1 | 8/2004 | Matusick et al. | |
| 2006/0113288 A1 * | 6/2006 | Kawamoto | B23K 26/0608 219/121.73 |
| 2009/0294417 A1 | 12/2009 | Spennemann et al. | |
| 2011/0284502 A1 | 11/2011 | Krink et al. | |
| 2012/0199562 A1 | 8/2012 | Friedel et al. | |
| 2012/0234802 A1 | 9/2012 | Wahl et al. | |

FOREIGN PATENT DOCUMENTS

| | | |
|---|---|---|
| CN | 101573205 A | 11/2009 |
| DE | 19944469 A1 | 4/2001 |
| DE | 102009006132 A1 | 5/2010 |
| DE | 102010005617 A1 | 4/2011 |
| EP | 1179382 A2 | 2/2002 |
| JP | 60148670 A | 8/1985 |
| WO | WO0064618 A2 | 11/2000 |
| WO | WO2004055563 A1 | 7/2004 |
| WO | WO2011029462 A1 | 3/2011 |
| WO | WO2013164076 A1 | 11/2013 |

OTHER PUBLICATIONS

Chinese Office Action, CN Application No. 201380034821.0, dated Sep. 22, 2015, 16 pages.

* cited by examiner

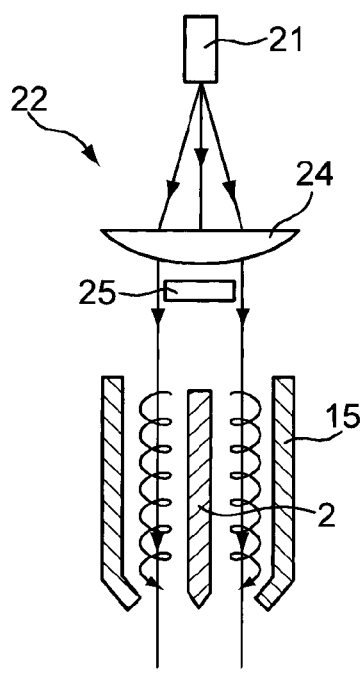
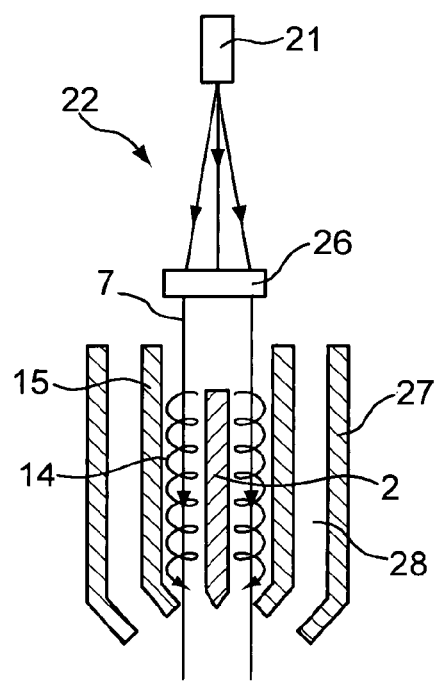
Fig.3        Fig.4
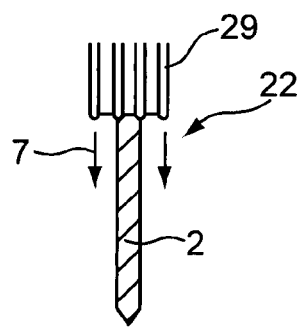
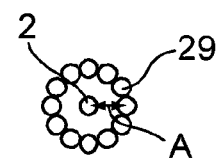
Fig.5a        Fig.5b
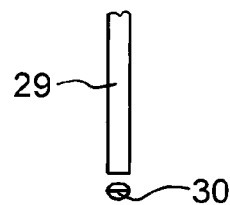
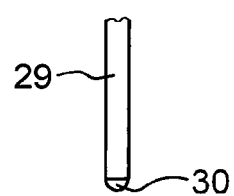
Fig.6a        Fig.6b

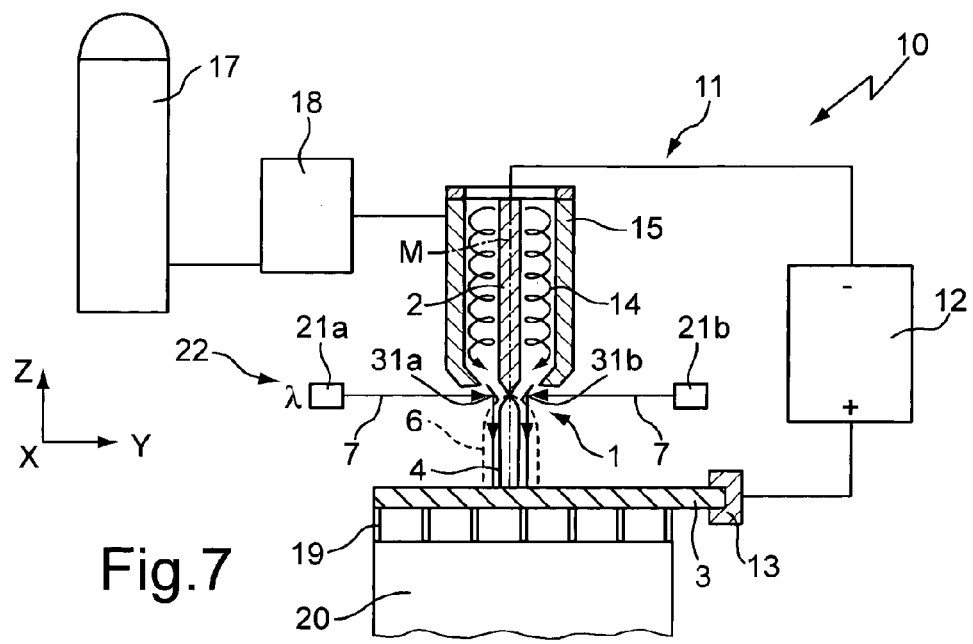
Fig.7
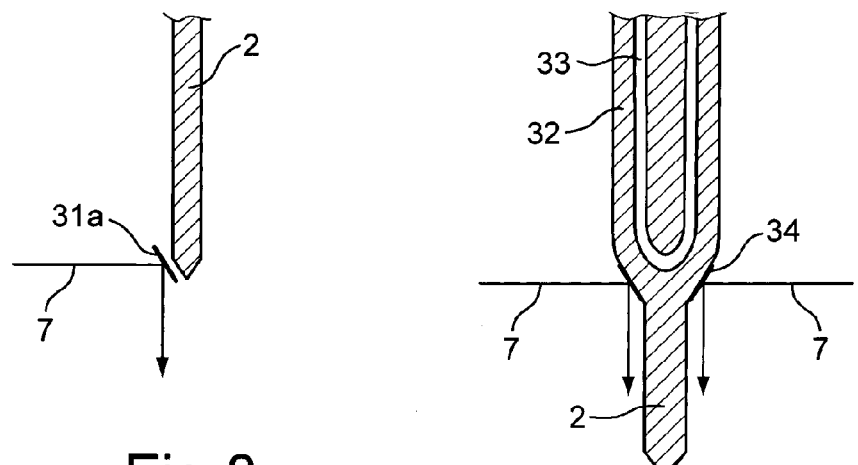
Fig.8
Fig.9

LASER-SUPPORTED PLASMA PROCESSING

CROSS-REFERENCE TO RELATED APPLICATIONS

This application is a continuation of and claims priority under 35 U.S.C. §120 to PCT Application No. PCT/EP2013/001230 filed on Apr. 24, 2013, which claimed priority to German Application No. DE 10 2012 207 201.2, filed on Apr. 30, 2012. The contents of both of these priority applications are hereby incorporated by reference in their entirety.

TECHNICAL FIELD

The present invention relates to methods, devices and systems for laser-supported plasma processing, particularly for laser-supported plasma cutting or plasma welding of workpieces.

BACKGROUND

During plasma cutting or plasma welding, an arc burns between a cathode and an anode. By means of impact ionization, there is produced a hot plasma or a plasma beam of a plasma gas having a temperature or more than 20,000 K. During plasma cutting or plasma welding of metal workpieces, the cathode is typically arranged in a processing head, whilst the electrically conductive workpiece to be processed forms the anode.

Owing to the conventionally used angular form of the cathode and the density distribution of the electrical field lines thereby produced, on the shortest connection line between the anode and the cathode, which corresponds to the center axis of the plasma beam, and in the central region of the plasma torch or the plasma beam adjacent to the center axis, the impact rate of the charged particles in the plasma is particularly high. The high impact rate leads to a high temperature and a high electrical conductivity of the plasma. This central region of the plasma torch is significantly constricted as a result of the increased conductivity and stable in terms of its shape. As the radial distance from the central region increases, the impact rate of the charged particles becomes substantially smaller and the temperature, density and electrical conductivity of the plasma torch decrease. This leads to fluctuations and to an expansion of the plasma beam. This instability and expansion of the edge region of the plasma beam produces an irregular and consequently poor cutting result during a plasma cutting operation. During a plasma welding operation, the weld seam is widened so that a smaller depth can be achieved and a greater thermal distortion occurs.

In order to guide, constrict and stabilize a plasma beam, various approaches are known.

DE 102009006132B4 discloses selective cooling of the plasma beam using a water-cooled nozzle, to draw energy from the plasma at the cathode base location. Owing to the supply and/or discharge of cooling fluid at a right angle relative to the longitudinal axis of the plasma torch head, a significantly longer contact of the cooling fluid with the nozzle is produced at that location. The plasma beam is thereby constricted at the cathode base location.

DE102010005617A1 discloses causing a current which flows through the plasma burner to pulse in a selective or controlled manner at least temporarily during the plasma cutting operation. Inter alia, it is also proposed therein to place the plasma gas and/or a secondary gas in a rotating flow by means of specially formed nozzles of the processing head.

WO2000064618A2 discloses, during plasma welding, superimposing a plasma beam and a laser beam to ignite the plasma beam and to guide it in the laser beam direction. The laser beam serves to excite molecules contained in the plasma gas to vibrations and thus to provide a beam path for the plasma beam.

WO2011029462A1 discloses a device and a method for processing workpieces with an arc device and a laser device in which a laser beam is guided within the plasma gas beam, the laser beam in the plasma gas beam forming a channel for increasing the conductivity of the plasma gas beam. The electrode of the arc device may be constructed as an annular electrode and the laser beam may extend inside the central opening of the annular electrode. Alternatively, one or more laser beam(s) can be directed to the processing location from outside so as to adjoin the plasma gas beam directly upstream of the processing location and so as to intersect it.

DE19944469A1 discloses a device for hybrid welding, in which at least one focused (alternatively optionally also defocused) laser beam is directed onto the workpiece to be processed and an electric arc is produced between an electrode and the workpiece, the axis of the arc being orientated concentrically relative to the laser radiation. The laser beam and the arc strike the workpiece (processing location) substantially at the same location and influence or support each other.

SUMMARY

One aspect of the invention features a method for laser-supported plasma cutting or plasma welding of a typically plate-like workpiece. The method includes: producing a plasma beam which extends in an expansion direction between an electrode and a processing location on the workpiece, the plasma beam having, with respect to a center axis thereof which extends in the expansion direction, a/an (radially) inner central region and a/an (radially) outer, substantially annular edge region; and supplying laser radiation, in particular collimated laser radiation or laser radiation with a great Rayleigh length, to the outer edge region of the plasma beam, the supplied laser radiation extending parallel with the center axis of the plasma beam. The method can enable improved stabilization and guiding of the plasma beam.

A significant aspect of the invention is not to coaxially illuminate the entire plasma torch or the entire plasma gas beam with the laser radiation, but instead to concentrate the intensity of the supplied laser radiation onto the edge region of the plasma beam so that only a negligibly small proportion of the intensity of the laser radiation is supplied to the central region. In this instance, collimated laser radiation or laser radiation with a great Rayleigh length is typically used in order to allow the laser radiation to be orientated (substantially) parallel with the center axis of the plasma beam and to have a uniform beam shape along the plasma beam. The laser radiation can be supplied to the plasma beam at the end thereof facing away from the workpiece (that is to say, in the region of the electrode) in order in this manner to achieve a uniform beam guiding over the entire length of the plasma beam. This is particularly favorable with plasma cutting, since above all thick metal sheets (10 mm-180 mm) are processed therein and a cutting edge with the smallest possible edge inclination is intended to be obtained so that the laser radiation supplied is intended to extend in the most parallel manner possible with respect to the center axis when passing through the workpiece. In order to achieve this, collimated laser radiation can be used, but it is also possible to use slightly focused or defocused laser radiation which has a Rayleigh length which is so large that the laser radiation extends (substantially) parallel with the center axis when passing through the workpiece. In order to ensure this, the Rayleigh length of the laser radiation used is preferred to be at least as large as the thickness of the processed workpiece.

Laser radiation supplied to the central region of the plasma beam, owing to the impact rate which is in any case high, does not have any or only has very little influence on the energetic state thereof. In the radially outer edge region of the plasma beam which has a lower plasma density, the laser radiation can in contrast be used in a selective and effective manner. The laser radiation consequently acts in a precise manner on the region of the plasma beam, which is responsible for the reduced cutting quality or the welding depth. The action of the laser radiation typically leads, in the edge region of the plasma beam owing to the optogalvanic effect, to an increased ionization of the plasma gas, whereby the temperature, the density and the electrical conductivity is increased in the irradiated plasma region. This stabilizes and narrows the plasma beam in a selective manner in the outer edge region and enables the plasma beam to be guided over the entire length thereof.

In a variant of the method, a wavelength of the laser radiation is selected in such a manner that a plasma gas which is used to produce the plasma beam is (electronically) excited by the laser radiation. The wavelength of the laser or laser radiation used is preferred to be selected in such a manner that there is carried out in the plasma gas an electron excitation which leads to the optogalvanic effect. Since argon is a frequently used plasma gas, argon ions can be excited, for example, by means of a diode laser with a wavelength of from 800 nm to 900 nm. Alternatively, it is also possible to directly ionize or excite argon atoms. To this end, wavelengths of from 200 nm to 500 nm are required and can be produced, for example, by means of frequency-doubled or frequency-tripled solid-state lasers. Of course, when plasma gases other than argon are used, the wavelength of the laser radiation could be adapted in an appropriate manner.

In some cases, the laser radiation supplied to the plasma beam has a power of less than 1000 Watt, preferably of less than 500 Watt. The laser beam or the laser radiation typically does not have sufficient energy or power to contribute itself to the workpiece processing, but instead serves exclusively to excite the optogalvanic effect in the edge region of the plasma. The laser power required to stabilize the plasma beam is dependent on the length of the plasma torch or the plasma beam and consequently on the thickness of the workpiece or metal sheet which is to be cut or welded. Furthermore, the power, owing to the Bouguer-Lambert-Beer law of absorption, is dependent on the ion density and the active cross-section of the ion or molecule density of the plasma gas which is intended to be electrically excited at the laser wavelength. A few hundred Watt of laser power are typically sufficient for the stabilization. For example, the laser power supplied to the plasma beam may be between approximately 100 W and approximately 500 W.

In a preferred variant of the method, the production of the plasma beam is carried out by means of a rod-like electrode, typically a tip electrode. Owing to the use of such an electrode, the excitement of the optogalvanic effect in the edge region of the plasma beam can be carried out without a complex processing head with coaxial guiding of the laser beam within the annular cathode. A tip electrode can further, owing to its geometry, produce a high field strength with smaller electrical voltage than a coaxial cathode, which is highly advantageous in terms of energy.

For the supply of the laser radiation to the plasma beam, in particular when a rod-like electrode is used, the laser radiation can be redirected at least at one redirection device which is offset laterally with respect to the center axis in a direction parallel with the center axis of the plasma beam. The value of the lateral offset of the redirection device with respect to the center axis of the rod-like electrode which corresponds to the center axis of the plasma beam, more specifically the spacing between the center axis and the location at which the laser radiation strikes the redirection device in the event of a 90° redirection, in this instance typically corresponds to the (mean) radius of the substantially annular edge region of the plasma beam.

The redirection device may be constructed, for example, as a redirection mirror or optionally as a reflective part-region of an electrode retention member and may have a planar or optionally curved, for example, frustoconical, reflective face. It is self-evident that, on the redirection device, a 90° redirection of the laser beam does not necessarily have to be carried out but instead that optionally a larger or a smaller redirection angle can also be used in order to orientate the laser radiation parallel with the center axis.

In another variant, the laser radiation is supplied to the plasma beam through a gas supply space of a gas nozzle in order to apply a plasma gas to the workpiece. In this variant, the laser radiation extends in the typically annular gas supply space parallel with the center axis of the gas nozzle, which generally corresponds to the center axis of the electrode, so that it is possible to dispense with a redirection device in the region of the gas nozzle of the plasma processing head which may form an interference contour for the flow of the plasma gas to the workpiece.

In another variant, the laser radiation supplied to the plasma beam has an annular, rotationally symmetrical or non-rotationally-symmetrical intensity distribution. The action of the laser radiation can in the simplest case be carried out in an annular manner in the entire edge region of the plasma beam. Alternatively, it is also possible to have a non-rotationally-symmetrical intensity distribution of the laser radiation. The intensity distribution of the laser radiation may, for example, be formed during cutting in such a manner that the laser radiation acts only at the cutting front and at the side of the good part, since the cutting quality at the side of the remaining grid, which is typically discarded as waste, is insignificant.

Another aspect of the invention features a system for laser-supported plasma cutting and/or plasma welding of a workpiece. The system includes: a plasma production device which is constructed to produce a plasma beam which extends between an electrode of the plasma production device and a processing location on the workpiece, the plasma beam having, with respect to a center axis thereof which extends in an expansion direction, a/an (radially) inner central region and a/an (radially) outer, substantially annular edge region, and a beam supply device for supplying (collimated) laser radiation (or radiation with a great Rayleigh length) to the outer edge region of the plasma beam. The laser radiation supplied to the outer edge region extends parallel with the center axis. In the system, the laser radiation supplied to the outer edge region is used to stabilize the plasma beam and to improve the cutting or welding result. The system can be selectively used for plasma cutting or plasma welding, depending on how the parameters for producing the plasma or the pressure of the gases used are selected.

In an embodiment, the system includes at least one laser source for producing laser radiation. The laser source may, for example, be a diode laser or a solid state laser. The selection of a suitable laser source is dependent in particular on the spectral properties (central wavelength and line width) but also on the quality of the wave front produced since an optimal collimation corresponds to a planar wave front and consequently enables particularly good stabilization and constriction of the plasma beam.

In a particular embodiment, the laser source is constructed to produce laser radiation at a wavelength which is suitable for exciting the plasma gas used to produce the plasma beam. The spectral transitions of plasma gases can be taken from databases, for example, the database which can be called up under "www.nist.gov/pml/data/asd.cfm." Plasma gases which are often used include argon or argon hydrogen mixtures, but it is also possible to use other gases, for example, nitrogen, oxygen or hydrogen and mixtures thereof, as plasma gases; air is also possible in some cases.

The power of the laser for producing the laser radiation can be not more than 1 kW, typically no more than 500 W. The laser power required for the stabilization or constriction of the plasma beam is comparatively small and is below the laser power which would be required in order to bring about a cutting or welding processing operation on the workpiece. With the maximum power of the laser source set out above, it is assumed that only a single laser source is present, whose laser power is supplied to the edge region of the plasma beam in a substantially loss-free manner. If more than one laser source is used to supply laser radiation to the edge region of the plasma beam, the maximum laser power of a respective laser source can be reduced accordingly.

In another embodiment, the electrode is constructed in a rod-like manner, typically with an acutely tapering end at which the field strength when a voltage is applied between the electrode and the workpiece to be processed is particularly high. As set out further above, the use of a rod-like electrode enables the use of a plasma processing head which has a highly simplified structural form compared with an annular electrode. However, it is self-evident that the system may optionally also have an annular electrode.

In an embodiment, the system has at least one redirection device which is offset laterally with respect to the center axis in order to redirect the laser radiation in a direction parallel with the center axis of the plasma beam. The redirection device(s) may, for example, be constructed as a redirection mirror which is spaced from the electrode.

In a preferred embodiment, the redirection device is formed on a cooled retention member of the electrode. The retention member may have one or more cooling channels for cooling using a cooling fluid, for example, water. The redirection device may in particular be formed in a, for example, frustoconical portion of the retention member which merges into the electrode or to which the electrode is fitted. In order to increase the reflectivity, the typically metal retention member may optionally be provided with a reflective coating in the region of the beam redirection. Carrying out the redirection at the retention member is more favorable than redirection at the electrode itself because the electrode is generally not cooled directly and has a very high temperature which may lead to an expansion of the metal material of the electrode and to local deformations which is unfavorable for selective redirection of laser radiation into the edge region of the plasma beam.

The beam supply device can be constructed to supply the laser radiation to the plasma beam through a gas supply space of a gas nozzle in order to apply a plasma gas to the workpiece so that a redirection of the laser radiation can be dispensed with in the region of the electrode.

In another embodiment, the beam supply device is constructed to produce laser radiation, in particular collimated laser radiation or laser radiation with a great Rayleigh length, with an annular, rotationally symmetrical or non-rotationally-symmetrical intensity distribution. The beam supply device typically has in this instance one or more optical elements on which a typically divergent or also convergent laser beam is (substantially) collimated. The annular intensity distribution is in the simplest case rotationally symmetrical, but it is also possible to produce a high radiation intensity only in one or more limited angular ranges. Of course, the (mean) radius of the annular intensity distribution substantially corresponds to the (mean) radius of the annular edge region of the plasma beam. The annular intensity distribution can be produced by means of a centrally arranged circular aperture, but it is also preferable for the annular intensity distribution to be able to be produced substantially without any loss of intensity.

In a development, the beam supply device has an axicon which has at least one cone-like lens face in order to produce from a typically divergent laser beam an annular, generally collimated intensity distribution without significant intensity loss of the laser radiation occurring in this instance.

In another development, the beam supply device has a diffractive optical element. Using a diffractive optical element, orders of diffraction of the laser radiation can be used in order to carry out a shaping of a typically divergent intensity distribution which strikes the diffractive optical element into an output-side intensity distribution which is shaped in almost any manner. A diffractive optical element can consequently be used in order to produce an annular, rotationally symmetrical or non-rotationally-symmetrical intensity distribution. The latter can be used, for example, to produce stabilization of the plasma beam during a plasma cutting operation only at one side of the cutting front at which a good part is formed, wherein a high cutting quality of the cutting edge is required.

In another embodiment, the beam supply device has a plurality of optical fibers which are arranged in an annular manner around the center axis and which are typically orientated parallel with the center axis and with which a microlens for collimation of discharged laser radiation is associated, respectively. The latter is required since the laser radiation being discharged at a fiber end of a respective (glass) fiber facing the workpiece is generally discharged in a divergent manner and therefore has to be (substantially) collimated. The microlenses may be arranged at a predetermined spacing from the respective fiber end or a respective fiber end may be provided with a microlens by it being melted so that the fiber end itself acts as a microlens (also called "lensed silica fiber").

Other advantages of the invention will be appreciated from the description and the drawings. The features mentioned above and those set out below may also be used individually per se or together in any combination. The embodiments shown and described are not intended to be understood to be a conclusive listing but are instead of exemplary character for describing the invention.

Figures 1A, 1B:
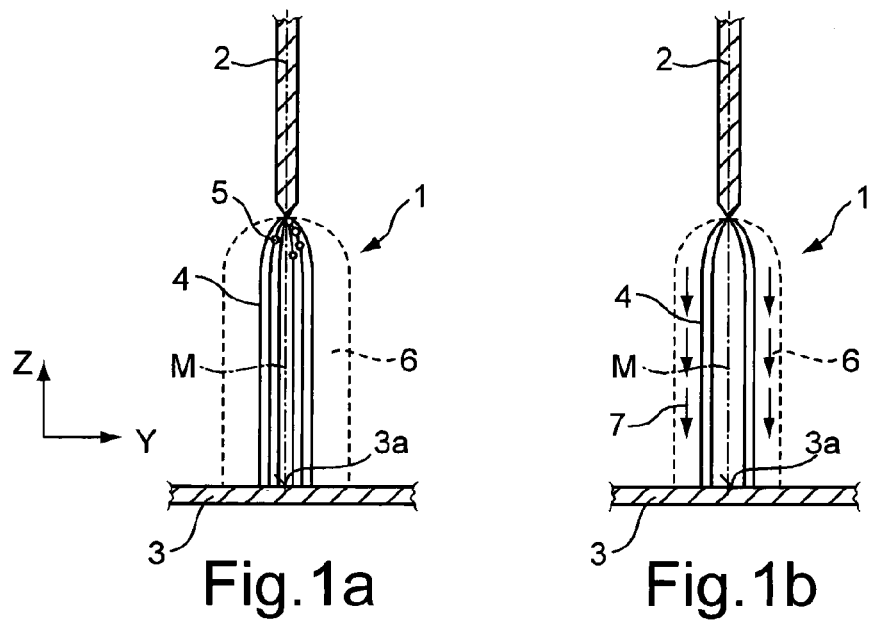
FIGS. 1a and 1b are schematic illustrations of a plasma beam for processing a workpiece without stabilization (FIG.

1a) and with stabilization and constriction by collimated laser radiation which extends in an edge region of the plasma beam (FIG. 1b).

Figure 2:
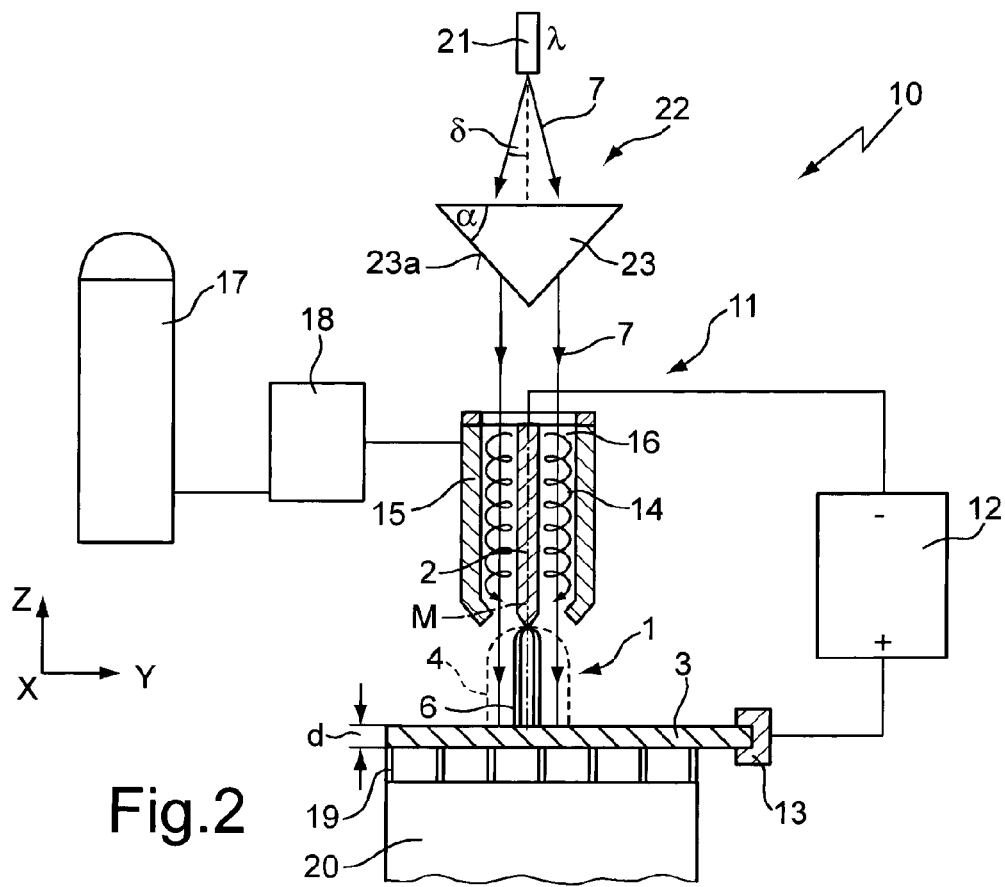

FIG. 2 is a schematic illustration of an example device for laser-supported plasma cutting or plasma welding using a beam supply device having an axicon for producing a laser beam with an annular intensity distribution.

FIG. 3 shows an example beam shaping device with a collimation lens and a circular aperture for producing an annular intensity distribution.

FIG. 4 shows another example beam shaping device having a diffractive optical element for producing an annular intensity distribution.

FIGS. 5a and 5b are a side view and a plan view of a plurality of optical fibers arranged in an annular manner about the center axis of an electrode, respectively.

FIGS. 6a and 6b show one of the optical fibers of FIGS. 5a and 5b with a microlens spaced apart from a fiber end (FIG. 6a) and a microlens formed at a fiber end (FIG. 6b).

FIG. 7 shows another example device for laser-supported plasma cutting or plasma welding with two redirection mirrors for redirecting laterally supplied laser radiation in the expansion direction of the plasma beam.

FIG. 8 shows a single redirection mirror for redirecting laser radiation in the expansion direction of the plasma beam.

FIG. 9 shows an example electrode with a fluid-cooled retention member which acts as a redirection device for laser radiation which is laterally supplied to the retention member.

DETAILED DESCRIPTION

FIG. 1a shows a plasma beam 1 which extends between a tip electrode 2 which acts as a cathode and a metal workpiece 3 (sheet) which acts as an anode and which serves to process the workpiece 3 depending on the application in a cutting or welding manner. The plasma beam 1 has a central, radially inner region 4, in the center of which there extends a center axis M, which constitutes the shortest connection line between the tip electrode 2 and the workpiece 3 and which corresponds to the center axis of the rod-like electrode 2. In the central region 4 of the plasma beam 1, the impact rate of charged (ionized) particles 5 of a plasma gas, in the present example argon, is particularly high. The high impact rate leads to a high temperature and a high electrical conductivity of the plasma in the central region 4 which is highly constricted and stable in terms of shape, that is to say, the plasma is typically substantially in thermodynamic equilibrium.

As the radial spacing from the center axis M increases, the impact rate decreases, whereby a radially outer (substantially annular) edge region 6 of the plasma beam 1, which region surrounds the substantially circular central region 4, has a lower impact rate and accordingly a lower temperature, density and electrical conductivity. This leads to the plasma beam 1 being expanded in the edge region 6 and the occurrence at that location of instabilities which may lead to an irregular and consequently poor cutting result during a plasma cutting operation and to an expansion of the weld seam during a plasma welding operation.

FIG. 1b shows the plasma beam 1 of FIG. 1a in which collimated laser radiation 7 which extends parallel with the center axis M of the plasma beam 1 (that is to say, perpendicularly relative to the workpiece 3) is additionally supplied to the radially outer edge region 6. The laser radiation 7 supplied to the edge region 6 leads to stabilization and in particular to a constriction of the plasma beam 1 in the edge region 6, as can be seen clearly by means of a comparison of FIG. 1a and FIG. 1b. As shown in FIG. 1b, the laser radiation 7 is supplied only to the edge region 6 but not to the central region 4 since laser radiation 7 supplied to the central region 4 owing to the high impact rate would have only a negligibly small influence on the stability of the plasma. The laser radiation 7 consequently acts precisely on the edge region 6 of the plasma beam 1, which is responsible for the reduced cutting quality or the small welding depth.

FIG. 2 shows an example of a device 10 which is constructed to carry out a laser-supported plasma cutting operation and/or plasma welding operation. The device 10 comprises a plasma production device 11 which has a power supply 12 in order to produce a voltage or electrical field between the tip electrode 2 which acts as a cathode and the metal plate-like workpiece 3 which acts as an anode. The electrical connection of the workpiece 3 to the power supply 12 is carried out, for example, by means of a contact clip 13 which is fitted laterally to the workpiece 3. When the tip electrode 2 is used as a cathode, the voltages required for the production of the plasma beam 1 are comparatively low so that the field strength in the region of the electrode tip is particularly high.

Another portion of the plasma production device 11 is constituted by a gas supply for supplying a plasma gas 14 to a gas nozzle 15. More specifically, the plasma gas 14 is supplied to an annular gas supply space 16 which is provided in the gas nozzle 15. The gas nozzle 15 forms a portion of a plasma processing head (not shown), to which the plasma gas 14 is supplied via supply channels which are not described in detail. The gas supply further has a gas reservoir 17 in which the plasma gas 14, for example, a mixture of argon and hydrogen, and process gases are stored. The gas reservoir 17 is connected to a device 18 for pressure adjustment for the plasma gas 14, in which device optionally mixing with other gases can also be carried out.

The plasma gas 14 supplied to the gas nozzle 15 is discharged from the gas nozzle 15 at a nozzle opening facing the workpiece 3. By applying a high voltage, the plasma torch is ignited (ignition phase). The plasma gas is ionized, whereby between the electrode 2 and the workpiece 3 there is formed the plasma beam 1 which comprises positive and negative ions, electrons and excited and neutral atoms and molecules. In order to be able to discharge the plasma and process gas 14 which passes through the workpiece 3 during a plasma cutting operation (cutting phase) at a cutting gap (not shown) in an unimpeded manner, a plurality of support webs 19 are provided as spacers on a workpiece support 20 (workpiece table). The gas mixture during the ignition and the cutting phase can differ in terms of the composition thereof and the volume flow. During processing of the workpiece 3 which is positioned on the workpiece support 20, there is typically carried out a relative movement between the workpiece 3 and the gas nozzle 15 or the plasma processing head (not shown) to which the gas nozzle 15 is fitted. The relative movement is typically carried out in the workpiece plane, that is to say, in the X and/or in the Y direction of an XYZ coordinate system. In order to produce the relative movement, the gas nozzle 15 can be moved with the plasma processing head, the workpiece 3 can be moved relative to the workpiece support 20 and/or the workpiece support 20 itself can be moved by means of conventional displacement units which will not be described in greater detail here.

In the device 10 shown in FIG. 2, a diode laser having a wavelength λ in the range from approximately 800 to 1000 nm acts as a laser source 21. The wavelength λ of the laser radiation 7 is in this instance adapted to the plasma gas 14 in such a manner that the ions 5 (cf. FIG. 1a) of the plasma gas 14, in this instance the argon ions, are electronically excited (optogalvanic effect). Alternatively or additionally, it is also possible to directly ionize gas atoms in the plasma gas 14, for which, with argon as a plasma gas 14, short wavelengths in the range between approximately 200 nm and 500 nm are typically required and can, for example, be produced by frequency-doubled or frequency-tripled solid-state lasers. Of course, in addition or as an alternative to argon, other plasma gases can also be used, for example, nitrogen, oxygen or hydrogen, the wavelength of the laser source 21 being able to be adapted to the respective plasma gases and preferably being between approximately 200 nm and 1000 nm. It is also optionally possible to use mixtures of a plurality of gases other than plasma gas 14, the electronic excitement or ionization of a single component of the plasma gas 14 optionally being able to be sufficient to bring about the desired constriction and stabilization of the plasma beam 1.

In order to produce the optogalvanic effect in the edge region 6 of the plasma beam 1, small laser powers are typically sufficient so that a maximum power of the laser source 21 of approximately 1000 W, typically between approximately 100 W and approximately 500 W, is sufficient if it is assumed that the available laser power of the laser source 21 is (almost) completely supplied to the edge region 6 of the plasma beam 1.

For the supply of the laser radiation 7 of the laser source 21 to the plasma beam 1, the device 10 has a beam supply device 22 which may be an integral component of the processing head. This has in the example shown in FIG. 2 an axicon 23 with a conical lens face 23a in order to produce an annular intensity distribution from the divergent intensity distribution of the laser radiation 7 discharged from the laser source 21 and to collimate the laser radiation 7.

The axicon 23 is arranged in this instance at a location in the divergent beam path of the laser radiation 7, in which the (mean) diameter of the annular intensity distribution produced by the axicon 23 substantially corresponds to the (mean) diameter of the substantially annular edge region 6 of the plasma beam 1 so that the laser radiation 7 collimated at the axicon 23 can be supplied directly through the gas supply space 16 of the gas nozzle 15 (that is to say, without additional optical elements) to the edge region 6 of the plasma beam 1. Since the thickness d of workpieces 3 during a plasma cutting operation is generally between approximately 10 mm and 180 mm, a small edge inclination and good contour precision of the cutting edges formed during plasma cutting are particularly important. This can be obtained using the collimated laser radiation 7 which has a uniform beam shape along the plasma beam 1.

Another possibility for producing collimated laser radiation 7 with an annular, rotationally symmetrical intensity distribution is illustrated in FIG. 3, in which the axicon 23 of the supply device 22 of FIG. 2 has been replaced by a collimation lens 24 and a circular aperture 25 which is arranged downstream in the beam path and which masks the radially inner region of the intensity distribution of the laser radiation 7 so that on the whole an annular intensity distribution is produced. The gas nozzle 15 or optionally the upper end of the tip electrode 2 may in particular also have a corresponding masking action so that the provision of an additional aperture, as shown in FIG. 3, may optionally be completely dispensed with.

Whilst, in the beam supply devices 22 shown in FIGS. 2 and 3, collimated laser radiation is produced with an annular intensity distribution and rotational symmetry, there is provided in the beam supply device 22 shown in FIG. 4 a diffractive optical element 26 which—depending on the configuration—enables the divergent intensity distribution of the laser source 21 to be shaped either into an annular intensity distribution with a rotational symmetry about the center axis M or—if desired—into a non-rotationally-symmetrical intensity distribution.

Such a non-rotationally-symmetrical intensity distribution may, for example, be advantageous when the device 10 for plasma cutting is used along a cutting front on the workpiece 3 on one cutting edge of which a good part is located, whilst the other cutting edge belongs to a residual grid, which is discarded after the cutting operation or after a plurality of additional cutting operations. In this instance, a high cutting quality is required only at the side of the cutting front at which the cutting edge of the good part extends since the cutting quality at the side of the residual grid is insignificant. Therefore, the diffractive optical element 26 (differently from what is illustrated in FIG. 4) may produce a non-rotationally-symmetrical, annular intensity distribution in which a high intensity is limited, for example, to that half of a circular ring along which the cutting edge of the good part extends.

In order to produce intensity distributions with a different geometry, the diffractive optical element 26 may optionally be replaced using an exchange device (not shown) with other diffractive optical elements. As can also be seen in FIG. 4, the gas nozzle 15 for applying the plasma gas 14 to the workpiece 3 may be surrounded in an annular manner by an additional gas nozzle 27 which has an additional annular supply space 28 for an enveloping or swirl gas (not shown) (oxygen, nitrogen or gas mixtures of nitrogen and oxygen).

A supply device 22 which also enables laser radiation 7 which is orientated parallel with the center axis M of the rod-like electrode 2 to be supplied through the annular supply space 16 of the gas nozzle 15, is shown in FIGS. 5a and 5b. The supply device 22 has in this instance a plurality of optical fibers 29 (fiber bundles) which are distributed in an annular arrangement about the center axis M of the electrode 2, as can be seen in particular in the plane view of FIG. 5b. A spacing A between the center axis M of the electrode 2 and a respective optical fiber substantially corresponds in this instance to the (mean) radius of the annular edge region 6 of the plasma beam 1.

In order to collimate the laser radiation 7 which is discharged in a divergent manner from the optical fibers 29, it is possible to use microlenses 30 which are either arranged with spacing from the respective fiber end (cf. FIG. 6a) or which are formed at a melted fiber end of a respective optical fiber 29 (so-called "lensed silica fiber"), cf. FIG. 6b.

Additionally or alternatively to the method described above, in which the laser radiation 7 is carried out through the gas supply space 16 of the gas nozzle 15 of a plasma processing head (not shown), in which a respective beam-shaping or collimating element 23, 24, 26, 29 is also typically integrated, a lateral supply of laser radiation 7 to the region of the nozzle opening of the gas nozzle 15 may also be carried out, as described in greater detail below with reference to an additional embodiment of the device 10, which is illustrated in FIG. 7.

In the device 10 of FIG. 7, laser radiation is guided substantially parallel with the workpiece 3 laterally in the outlet-side region of the gas nozzle 15, into the region of the angular end of the rod-like electrode 2. In the present example, there are fitted at that location two planar redirection mirrors 31a, 31b which redirect the laser radiation 7 through 90° and supply it in the direction of the center axis M to the edge region 6 of the plasma beam 1. The laser radiation 7 in the example shown in FIG. 7 is produced by two different laser sources 21a, 21b, but it is self-evident that the laser radiation 7 can be produced by only one or a plurality of laser sources and divided, for example, by means of a beam splitter, so that the respective part-beams are supplied to one of the redirection mirrors 31a, 31b.

The location at which the laser radiation strikes the respective redirection mirror 31a, 31b is positioned in such a manner that the laser radiation 7 is redirected into the annular edge region 6 of the plasma beam 1 (but not into the central region 4). It is, of course, also possible to provide more than two redirection mirrors in the region of the electrode 2 in order to supply laser radiation 7 to the edge region 4 of the plasma beam 1, these being able to be arranged, for example, in the peripheral direction at regular angular distances with respect to each other. Optionally, in place of a plurality of planar redirection mirrors, it is also possible to provide one or more surrounding conical mirror faces in the region of the electrode 2 in order to redirect laser radiation 7 which is introduced in a radial direction in the edge region 4 of the plasma beam 1.

Since the plasma beam 1 burns only from the tip of the electrode 2, the redirection mirrors 31a, 31b, in contrast to what is shown in FIG. 7, can also be fitted further up in the gas nozzle 15. For lateral supply of the laser radiation 7, the wall of the gas nozzle 15 may be provided with a transparent material (for example, glass or the like) in this instance. In order to prevent redirection mirrors 31a, 31b from forming an interference contour for the flow of the plasma gas, it is optionally also possible to provide in the gas nozzle 15 in place of an annular supply space a plurality of, for example, four, supply spaces which are distributed in the peripheral direction about the electrode 2 and between which the redirection mirrors are arranged. The laser radiation 7 of the laser sources 21a, 21b can (by means of optical elements not shown in FIG. 7) strike the redirection mirrors 31a, 31b in a collimated state. Alternatively or additionally, the redirection mirrors 31a, 31b or the mirror faces thereof may have a curvature in order to collimate laser radiation 7 which strikes them in a typically divergent manner during redirection.

As shown in FIG. 8, it may also be possible to provide only a single redirection mirror 31a which is laterally offset with respect to the electrode 2 in the device 10 in order to supply the laser radiation 7 to a portion of the edge region 6 of the plasma beam 1 that is comparatively small in the peripheral direction. Typically in this instance, the cutting edge of the cutting front which faces the good part and in which a high cutting quality is intended to be obtained is in the portion of the edge region 6 of the plasma beam 1 in which the laser radiation 7 is supplied.

Another possibility for laterally supplying laser radiation 7 to the edge region 6 of the plasma beam 1 is illustrated in FIG. 9 in which a reflective, conically tapering portion of a retention member 32 for the rod-like electrode 2 acts as a redirection device 34. Reflective members which it is possible to use include, for example, a dielectric or a metal coating, for example, of aluminum. A cooling channel 33 is introduced in the electrode retention member 32 in order to cool the retention member 32 or the rod-like electrode 2 using a cooling fluid (not shown), for example, with water. The provision of the redirection device 34 for the laser radiation 7 in a cooled region is advantageous since the electrode 2 itself is typically heated to very high temperatures so that there may occur an expansion and possibly deformation of the material of the electrode 2, which make it more difficult to selectively redirect collimated laser radiation 7 or to collimate the laser radiation 7 during the redirection into the edge region 4.

By means of the devices 10 described above, it is possible using the collimated laser radiation 7 which is introduced into the edge region 6 of the plasma beam 1 and which typically extends along the entire plasma beam 1 from the electrode 2 to the workpiece 3 and has a consistent beam shape, to achieve a uniform beam guiding of the plasma beam 1 and consequently a stabilization or constriction of the plasma beam 1. In this manner, during plasma cutting, an improvement of the cutting quality with respect to edge inclinations and contour precision and an increase of the possible feed speeds can be achieved by a narrower cutting gap. During a plasma welding operation using the devices 10, deeper, thinner weld seams and a smaller heat influence zone can be achieved. An improvement of the processing quality can also be achieved if, in place of collimated laser radiation (as described above), there is used laser radiation which is not completely collimated and which has a great Rayleigh length, that is to say, laser radiation which extends as parallel as possible or in a substantially parallel manner with respect to the center axis.

A number of embodiments of the invention have been described. Nevertheless, it will be understood that various modifications may be made without departing from the spirit and scope of the invention. Accordingly, other embodiments are within the scope of the following claims.

What is claimed is:

1. A method of laser-supported plasma processing of a workpiece, the method comprising:
   producing a plasma beam which extends in an expansion direction between an electrode and a processing location on the workpiece, wherein the plasma beam has, with respect to a center axis of the plasma beam which extends in the expansion direction, an inner central region and an outer edge region; and
   supplying collimated later radiation with an annular intensity distribution to the outer edge region of the plasma beam, wherein an intensity of the supplied laser radiation is concentrated onto the outer edge region of the plasma beam such that its intensity per unit area at any point in the outer edge region is greater than the intensity of the radiation per unit area supplied to any point in the inner central region, and wherein the supplied laser radiation extends parallel with the center axis.

2. The method of claim 1, wherein a wavelength of the supplied laser radiation is selected such that the plasma gas used to produce the plasma beam is configured to be excited by the laser radiation.

3. The method of claim 1, wherein the supplied laser radiation has a power of less than 1000 Watt.

4. The method of claim 1, wherein the laser radiation is redirected in a direction parallel with the center axis of the plasma beam at least at one redirector which is offset laterally to the center axis of the plasma beam.

5. The method of claim 1, wherein the laser radiation supplied to the plasma beam has one of an annular, rotationally symmetrical intensity distribution and an annular, non-rotationally-symmetrical intensity distribution.

6. The method of claim 1, further comprising processing the workpiece with the plasma beam supplied with the laser radiation, wherein processing the workpiece comprises at least one of plasma cutting and plasma welding.

7. The method of claim 1, wherein the laser radiation is supplied only to the outer edge region of the plasma beam.

8. The method of claim 1, further comprising:
generating the collimated laser radiation with the annular intensity distribution by collimating a laser radiation having a divergent intensity distribution.

9. The method of claim 8, wherein generating the collimated laser radiation with the annular intensity distribution comprises:
collimating the laser radiation having the divergent intensity distribution by an optical device including one of an axicon with a conical lens face, a diffractive optical element, and a collimation lens and a circular aperture arranged downstream in a beam path of the laser radiation.

10. The method of claim 1, wherein the laser radiation does not have sufficient energy to contribute itself to the workpiece processing.

11. The method of claim 1, wherein the electrode includes a rod-like electrode, and wherein producing a plasma beam comprises producing the plasma beam by the rod-like electrode, and
wherein supplying the collimated laser radiation comprises supplying the collimated laser radiation with the annular intensity distribution to the outer edge region of the plasma beam through a gas supply space of a gas nozzle configured to apply plasma gas to the workpiece, the gas supply space surrounding the rod-like electrode.

12. A laser-supported plasma workpiece processing system, comprising:
a plasma production device constructed to produce a plasma beam that extends in an expansion direction between an electrode of the plasma production device and a processing location on the workpiece, wherein the plasma beam has, with respect to a center axis of the plasma beam that extends in the expansion direction, an inner central region and an outer edge region; and
a beam supply device configured to supply collimated laser radiation with an annular intensity distribution to the outer edge region of the plasma beam, wherein an intensity of the supplied laser radiation is concentrated onto the outer edge region of the plasma beam such that its intensity per unit area at any point in the outer edge region is greater than the intensity of the radiation per unit area supplied to any point in the inner central region, and wherein the supplied laser radiation extends parallel with the center axis of the plasma beam.

13. The system of claim 12, further comprising at least one laser source for producing the laser radiation.

14. The system of claim 13, wherein the laser source is constructed to produce laser radiation at a wavelength suitable for exciting the plasma gas, the plasma gas located in a gas store of the system and used to produce the plasma beam.

15. The system of claim 12, further comprising at least one redirection device that is offset laterally with respect to the center axis of the plasma beam and configured to redirect the laser radiation in a direction parallel with the center axis.

16. The system of claim 15, wherein the redirection device is formed on a cooled retention member of the electrode.

17. The system of claim 12, wherein the beam supply device is constructed to produce the laser radiation with one of an annular, rotationally symmetrical intensity distribution and an annular, non-rotationally-symmetrical intensity distribution.

18. The system of claim 12, wherein the beam supply device comprises an axicon.

19. The system of claim 12, wherein the beam supply device comprises a diffractive optical element.

20. The system of claim 12, wherein the beam supply device comprises a plurality of optical fibers which are arranged in an annular manner around the center axis and wherein a respective microlens for collimation of discharged laser radiation is associated with each of the plurality of optical fibers.

21. The system of claim 12, configured to perform at least one of plasma cutting and plasma welding on the workpiece, using the plasma beam supplied with the laser radiation.

22. The system of claim 12, wherein the electrode is constructed in a rod-like manner, and
wherein the beam supply device is constructed to supply the collimated laser radiation with the annular intensity distribution to the outer edge region of the plasma beam through a gas supply space of a gas nozzle to apply plasma gas to the workpiece, the gas supply space surrounding the electrode.

* * * * *

UNITED STATES PATENT AND TRADEMARK OFFICE
CERTIFICATE OF CORRECTION

| | |
|---|---|
| PATENT NO. | : 9,849,545 B2 |
| APPLICATION NO. | : 14/526808 |
| DATED | : December 26, 2017 |
| INVENTOR(S) | : Andreas Popp, Tim Hesse and Tobias Kaiser |

Page 1 of 1

It is certified that error appears in the above-identified patent and that said Letters Patent is hereby corrected as shown below:

In the Claims

<u>Column 12</u>
Line 40, in Claim 1, delete "later" and insert -- laser --

Signed and Sealed this
Twenty-second Day of May, 2018

Andrei Iancu
*Director of the United States Patent and Trademark Office*